W. & I. G. EMERY.
SHIPPING CASE.
APPLICATION FILED DEC. 14, 1912.
1,197,018.
Patented Sept. 5, 1916.
3 SHEETS—SHEET 1.
Fig. 1
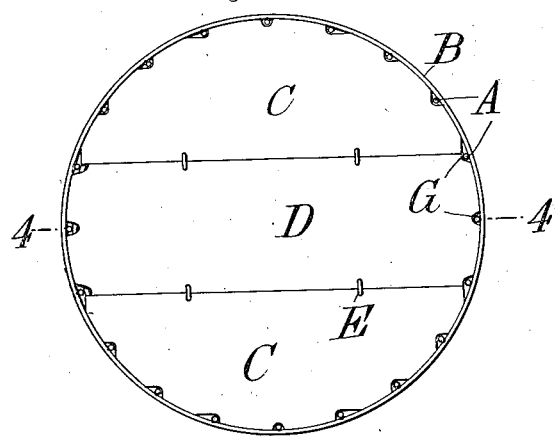
Fig. 2
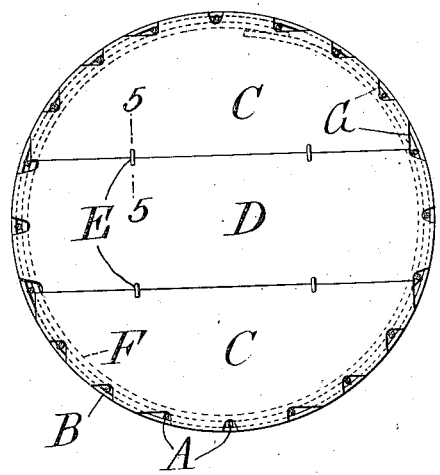
Fig. 3
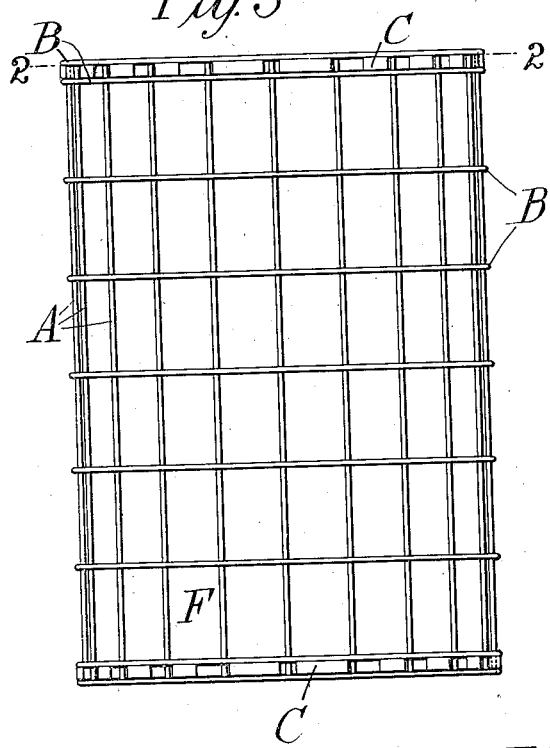
Fig. 4
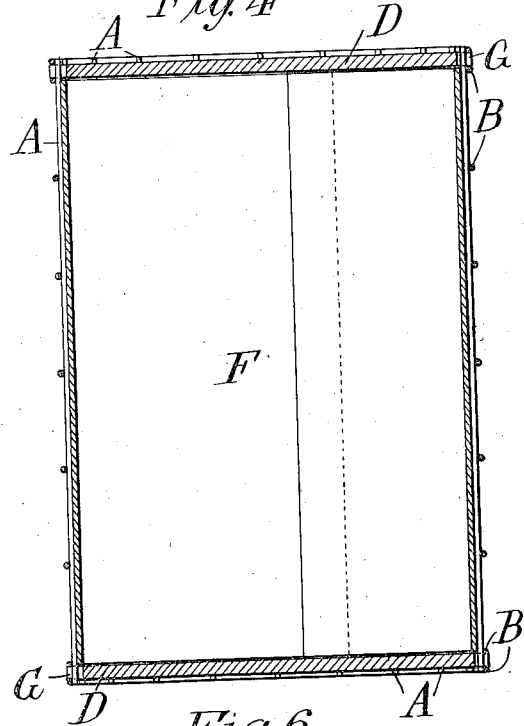
Fig. 5
Fig. 6
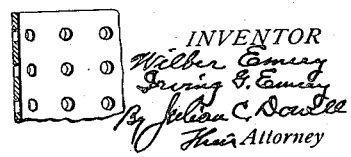
WITNESSES
Joseph C. Stack
W. Wallace Navin Jr.
INVENTOR
Wilbur Emery
Irving G. Emery
By Julian C. Dowell
Their Attorney W. & I. G. EMERY.
SHIPPING CASE.
APPLICATION FILED DEC. 14, 1912.
1,197,018.
Patented Sept. 5, 1916.
3 SHEETS—SHEET 2.
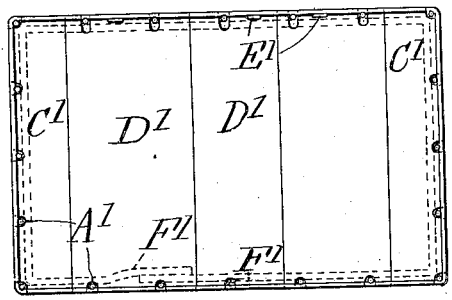
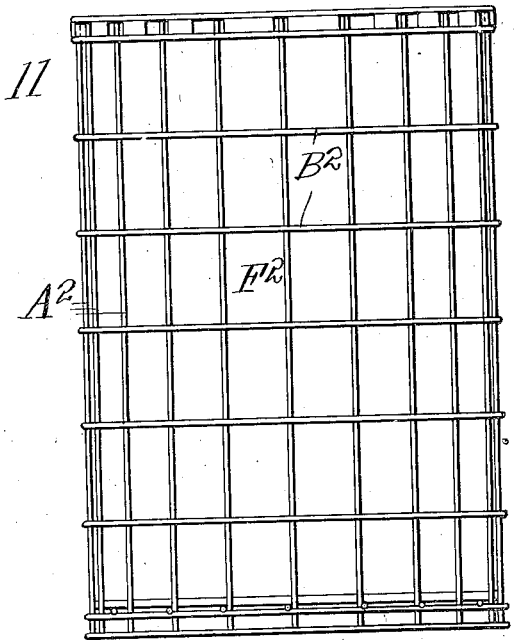
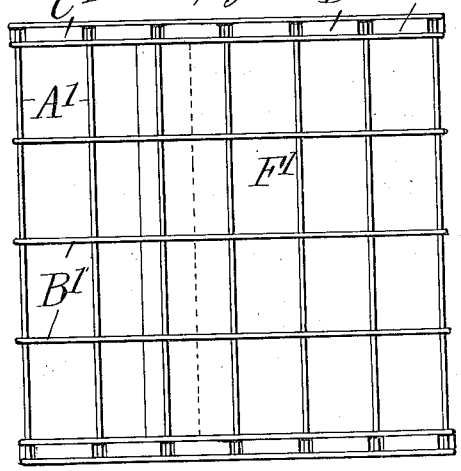
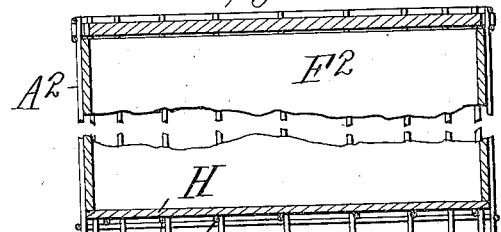
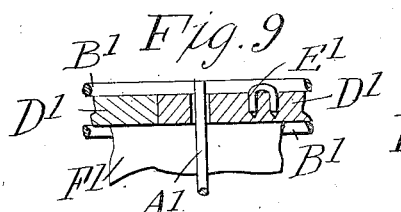
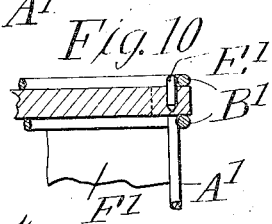
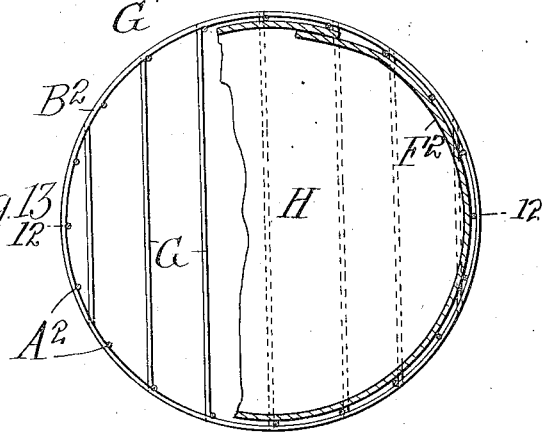
WITNESSES
INVENTOR

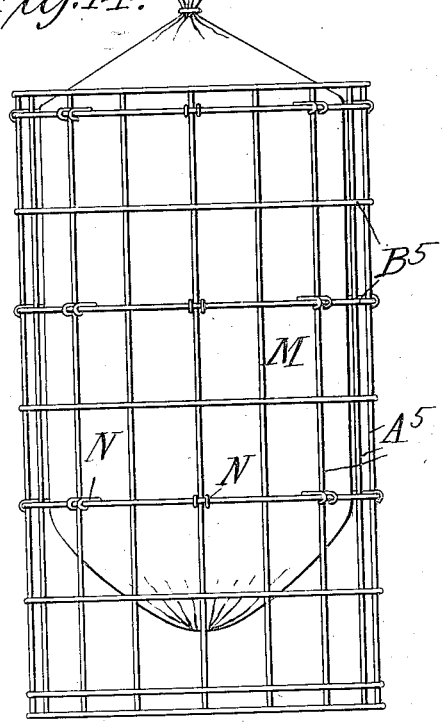
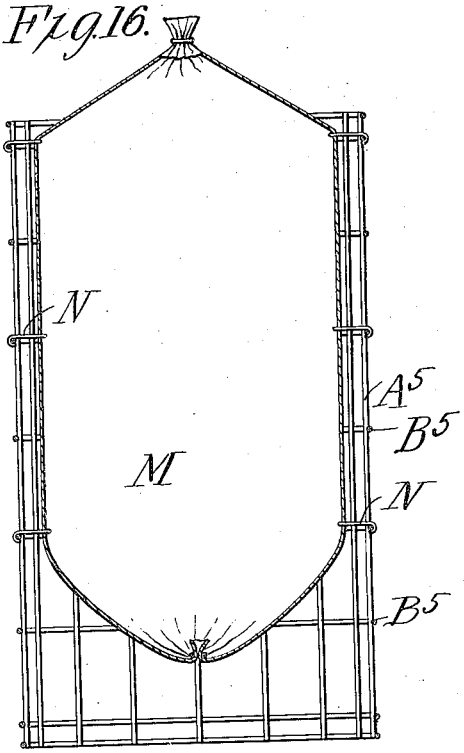
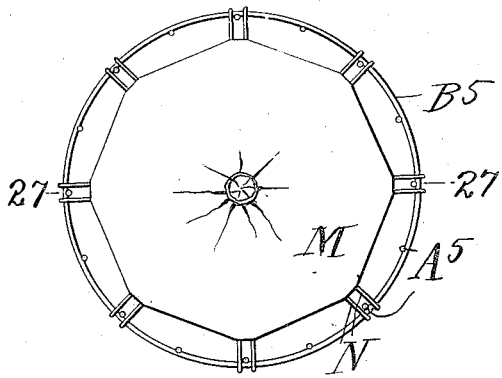
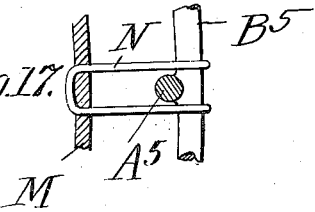
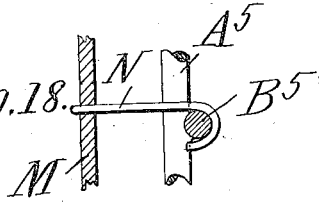

UNITED STATES PATENT OFFICE.

WILBER EMERY, OF BRANDYWINE HUNDRED, DELAWARE, AND IRVING GRANT EMERY, OF EVANSVILLE, INDIANA.

SHIPPING-CASE.

1,197,018.                    Specification of Letters Patent.          Patented Sept. 5, 1916.

Application filed December 14, 1912. Serial No. 736,811.

*To all whom it may concern:*

Be it known that we, WILBER EMERY and IRVING GRANT EMERY, citizens of the United States of America, residing in Brandywine Hundred, in the county of New Castle and State of Delaware, and at Evansville, in the county of Vanderburg and State of Indiana, respectively, have invented certain new and useful Improvements in Shipping-Cases; and we do hereby declare the following to be a full, clear, and exact description of the invention, such as will enable others skilled in the art to which it appertains to make and use the same.
This invention relates to shipping cases, and more particularly to shipping crates or cases designed for a variety of uses to which the common wooden barrel or box is applied, the object being to provide a device of the character referred to having a reticulated framework of metal, preferably heavy steel wires or rods welded together where they intersect, and a sectional head or heads, preferably of wood, so constructed and arranged that the head may be removed and replaced without injury, so that the crate or case may be used over and over again for the same or similar purposes. For bulky articles, for which a wooden crate might ordinarily be employed, the case having a reticulated framework of metal with wooden heads, as above described would be sufficient, but for the retention of less bulky articles, such as apples, we provide a lining, preferably made of a stiff sheet of fibrous material, bent to conform to the inner dimensions of the shipping case. For the retention of ground grain, such as flour, we use a stiff closed lining with a head or heads, all preferably of fibrous material, forming an inner container arranged within the outer metal framework. For liquids we provide a lining, preferably of corrugated sheet metal, bent to conform to the inner dimensions of the metal case or framework and welded at the joint and provided with sheet steel heads welded thereto so as to form an independent inner case within the outer reticulated case of metal. The device is also applicable for use as a banana crate, by omitting the wooden heads and suspending a flexible bag within the outer metal case to receive and hold the bananas in the usual manner.

A further object of the invention is to provide a permanent metal case with a lin- ing which may be easily removed and replaced at very little expense, thus providing a sanitary case which can be used over and over again, the cost of re-use when the case becomes unsanitary being limited to the cost of a new lining.

A further object is to provide a shipping case of the character described, reinforced at the ends to provide against distortion in use.

The invention will first be hereinafter more particularly described, with reference to the accompanying drawings, which form a part of this specification, and then pointed out in the claims at the end of the description.

Figure 1 of the drawings is a top or plan view of a shipping case embodying our invention; Fig. 2 is a sectional view of the same, the section being taken on line 2—2 of Fig. 3; Fig. 3 is a side elevation of the case; Fig. 4 is a vertical sectional elevation of the same, the section being taken on line 4—4 of Fig. 1; Fig. 5 is a detail fragmentary view taken on line 5—5 of Fig. 2, illustrating one method of securing the parts of the top or head together after they have been inserted in proper position; Fig. 6 is a detail fragmentary view illustrating a method of ventilating the lining; Fig. 7 is a top or plan view of a shipping case embodying our invention in box-like form; Fig. 8 is a side elevation of the structure shown in Fig. 7; Fig. 9 is a detail sectional view on a slightly enlarged scale of a modification of the means for securing the parts of the head in place; Fig. 10 is a detail sectional view taken at right angles to the view shown in Fig. 9; Fig. 11 is a side elevation of a modification embodying our invention in basket-like form with a lined wire bottom and removable head; Fig. 12 is a vertical sectional elevation of the end portions of the case shown in Fig. 11, taken on line 12—12 of Fig. 13, the intermediate portion being broken away; Fig. 13 is an inverted plan or bottom view of the case shown in Figs. 11 and 12, showing the wire bottom, a portion of the lining being broken away to show the disposition of the cylindrical lining; Fig. 14 is a side elevation of another modification of our invention adapted for use as a banana crate; Fig. 15 is a top or plan view of the device shown in Fig. 16; Fig. 16 is a vertical sectional elevation taken on line 27—27 of Fig. 17; Fig. 17 is a detail sectional view illustrating the mode of securing a bag within the outer case shown in Fig. 14, and Fig. 18 is a similar view taken at right angles to Fig. 17.

Referring to the drawings, in which the same letters or reference are used to denote corresponding parts in different views, it will be seen that in each of the illustrated constructions there is an outer case or crate consisting essentially of staves A and hoops or bands B, preferably of wire, which are welded or otherwise secured together at the points of intersection, preferably by electric welding, and that at one or both ends there are two hoops or bands B with an intervening space of the same thickness as the material to be used as a head or closure for the top and bottom of the case or crate whether of cylindrical or box-like form. As shown the hoops B are connected by a series of short wires or continuations of the staves A, so that the two end hoops perform the function of stiffening the case and preventing distortion in practical use. The staves or wires thus arranged also form a neat, strong and compact reticulated framework, which needs only the addition of a head or heads to complete the case. The heads of the case are preferably composed of wood and made in sections which may consist, as shown in Figs. 1 to 4, of two segmental side pieces C, and an intermediate piece D, the latter being of sufficient width and of such shape as to fill the space between the two side pieces C. The edges of these sections are notched or recessed, as shown, co-incident with the short wires or staves connecting the two end hoops B, the notches being sufficiently wide and deep to allow them to extend around or straddle the upright wires or staves and permit the insertion of the side pieces of the head between the top and bottom pairs of hoops. In order that the intermediate piece or pieces may be introduced between the side pieces after the latter are in place, the notches at one end thereof are made somewhat deeper than the notches at the other end so as to permit one end to be pushed far enough between the pairs of hoops to allow the other end to clear said hoops and be dropped down flush with the side pieces and then drawn back into place with both ends resting between the hoops. The several pieces may then be firmly secured or locked in place by suitable fastenings, for instance, by ordinary staples E, (Figs. 1, 2 and 5) having one prong driven into each of two adjoining sections, or by staples driven into the head piece or section adjacent to the hoop at the end of the intermediate piece having the deeper notches. Inside of the wire framework and extending from head to head is placed the lining F, (Figs. 1 to 4) preferably of stiff fibrous material, either plain or corrugated and, if desired, perforated to provide for ventilation as indicated in Fig. 6. This lining may be made from a sheet of suitable material bent into the desired shape to conform to the interior of the crate with the ends thereof overlapping to prevent the contents from escaping.

In Figs. 7 and 8 of the drawings we have shown a shipping case in box-like form provided with an inner lining $F^1$ made out of a sheet of stiff fibrous material bent to conform to the interior dimensions of the wire framework and inserted therein with the ends overlapping, as indicated in dotted lines in Fig. 7. The top or head of the crate in this instance consists of side or end pieces $C^1$ and a plurality of intermediate pieces $D^1$ suitably notched at their edges for insertion between the pairs of wires at the top and bottom of the case in the manner already described; the intermediate pieces being secured against endwise movement by the staples $E^1$ driven therein adjacent to the hoop at the end having the deeper notches, as shown in Figs. 7, 9 and 10. Pins or nails might be used for this purpose instead of staples.

In Figs. 11, 12 and 13 is shown a case constructed in basket-like form with vertical wires $A^2$ and hoops $B^2$ welded together. It may be either cylindrical, as shown, or angular, after the fashion of a box. In this instance the case has wires G extending across the bottom thereof, which are welded to the upright staves or wires $A^2$ where they intersect and support a bottom plate or lining H, preferably of fibrous sheet material, forming the bottom of the inner lining $F^2$, the other end being closed by a removable head constructed substantially as described with reference to Figs. 1 to 4 of the drawings, and secured in place in the manner hereinbefore described.

In Figs. 14 to 17 we have shown a shipping case adapted for use as a banana crate. The outer case is essentially the same as described with reference to Figs. 1 to 4, except that the heads are omitted and a bag M, preferably composed of burlap is suspended inside of the outer reticulated framework by means of bi-pronged hooks N straddling the vertical rods $A^5$ and engaging the hoops $B^5$ of the outer case, as shown, the hoops and rods being welded together as indicated in Figs. 17 and 18.

The utility and advantages of our improvement are obvious. By the described construction we provide a clean, strong and durable shipping case for all purposes for which ordinary barrels and boxes are adapted to be used, and which can be manufactured in as many shapes and sizes as desired, and in which the lining may be removed and a new one inserted if desired, after each shipment, thus reducing the expense, so far as the shipping case is concerned, after it has once been used, to the mere cost of the inner lining. The improvement also provides a case for transporting liquids, so constructed that the closed case may be made of very light material and yet be supported against internal strain (many liquids being put into their cases under pressure) by the supporting outer framework.

It will be understood, of course, that our invention is not limited to a crate or case of any particular form or shape, as the outer metal framework and the inner lining may be constructed in various forms, either barrel-like or box-like, whether cylindrical, hexagonal, octagonal, conical, square or rectangular in form, nor do we desire to be limited to the use of any particular kind of material for the outer framework or the heads thereof or the inner lining, nor to staves and hoops, wires or rods arranged at right angles to each other, as it is obvious that various changes may be made in the details and arrangement of parts without departing from the spirit and scope of our invention.

Having thus described our invention what we claim as new and desire to secure by Letters Patent of the United States is:

1. A shipping case comprising a reticulated metallic framework open at both ends consisting of upright staves and horizontal hoops joined together where they intersect; there being two closely arranged hoops at each end, and detachable sectional heads for closing said open ends; said heads consisting of several sections supported between the closely arranged hoops at each end of the framework, the sections of the heads being notched to receive the staves connecting said closely arranged hoops.

2. A shipping case comprising a reticulated metallic framework open at each end consisting of upright staves and horizontal hoops, and detachable sectional heads supported between adjacent hoops at each end of the framework, said sectional heads having notches to receive the staves, the intermediate section having notches deeper at one end than at the other to permit endwise movement to a limited extent for inserting them in place after the outer sections have been inserted.

3. A shipping case consisting of a series of vertical staves rigidly secured together by hoops, and having a pair of hoops at the top and a pair at the bottom between which pairs heads are secured, the pair of hoops at each end being separated a distance equal to the thickness of the heads, and said heads consisting of several flat sections having notches in their ends to receive the staves, the notches at one end of the intermediate sections being deeper than those at the other end thereof, and means for locking said pieces in place.

4. A shipping case comprising a series of vertically and horizontally disposed wires welded together at intersecting points to form a reticulated framework having open ends, said ends being closed by detachable sectional heads, the sections of the heads being secured together flatwise and having their ends notched to receive the staves and confined and extending between adjacent horizontally disposed wires whereby they are retained in place.

5. A shipping case comprising a series of wires welded together at intersecting points to form a reticulated body having open ends, one of said ends being closed by a detachable sectional head, the sections of which are secured together flatwise with their ends notched to receive the staves and confined and extending between adjacent horizontally disposed wires by which they are retained in place.

6. A shipping case comprising a framework composed of wire staves and hoops connecting said staves to form a barrel-like structure, the two hoops at one end being close together, and a head composed of several sections having notches in the edges of the sections adapted to receive the staves, said sections being inserted between the two end hoops, which hold the head in place therebetween and means for securing the sections of the head together.

7. A shipping case consisting of a series of horizontal bands rigidly secured to a series of vertical staves forming a framework open at opposite ends, heads for said ends consisting of several pieces of material secured together flatwise and having notches cut in their ends to receive said staves, the notches at one end of an intermediate piece being cut deeper than those at the other end thereof to permit endwise movement to a limited extent for inserting it in place, together with means for securing said pieces together.

8. A shipping case consisting of a series of vertical wires rigidly secured together by hoops or bands and having a pair of bands at the top and a pair at the bottom between which are secured wooden heads, the pair of bands at each end being separated a distance equal to the thickness of the heads, and said heads consisting of several flat sections having notches in their ends to receive said wires, the notches at one end of one of the intermediate sections being deeper than those at the other end thereof, and means for locking said pieces in place.

9. A shipping case comprising spaced vertically disposed wires and horizontally disposed hoops joined together where they intersect and forming a reticulated framework with an open end; there being at said end two closely arranged horizontal hoops, and a closure for said open end consisting of several separate sections of wood arranged flatwise with their marginal portions projecting between said closely arranged horizontal hoops and engaging the vertical wires.

10. A shipping case comprising a series of vertically disposed wires and horizontally disposed hoops welded together at intersecting points to form a reticulated framework, there being at one end of said framework two horizontal hoops relatively close together and rigidly connected to each other by relatively short upright wires.

11. A shipping case comprising a reticulated metallic frame-work composed of upright wires and spaced horizontal hoops, said case being open at both ends; a pair of closely arranged horizontal hoops at each end, and a detachable head supported between each pair of hoops; said head consisting of several sections, the intermediate section having notches therein of sufficient depth to permit endwise movement to a limited extent for inserting it in place after the outer sections have been inserted.

In testimony whereof we affix our signatures in the presence of two witnesses.

WILBER EMERY.
IRVING GRANT EMERY.

Witnesses for Wilber Emery:
SADIE GLUCKMAN,
BARNET GLUCKMAN.
Witnesses for Irving Grant Emery:
CHAS. P. BOCK,
HARRY W. ROSE.